United States Patent [19]

Duncan et al.

[11] 3,744,646
[45] July 10, 1973

[54] WHEEL MOUNTING MEANS FOR DISHWASHER RACKS

[75] Inventors: Thomas W. Duncan; Sylvan L. Hiers, both of Connersville, Ind.

[73] Assignee: Design and Manufacturing Corporation, Connersville, Ind.

[22] Filed: July 19, 1971

[21] Appl. No.: 163,830

[52] U.S. Cl. ............ 211/162, 211/41, 211/151, 312/350
[51] Int. Cl. .................. A47f 5/00, A47g 19/08
[58] Field of Search ............ 211/162, 151, 153, 211/41, 181, 126; 312/350, 349, 347, 334, 332, 321, 318, 307; 16/45, 97, 106; 46/201, 221; 308/3.8

[56] References Cited
UNITED STATES PATENTS

| | | |
|---|---|---|
| 3,261,647 | 7/1966 | Stewart .................................. 308/3.8 |
| 3,106,202 | 10/1963 | Arduna ........................... 312/350 UX |
| 3,433,363 | 3/1969 | Clearman et al. ...................... 211/41 |
| 3,466,109 | 9/1969 | Kauffman et al. ............... 312/349 X |
| 3,611,629 | 10/1971 | Foley et al. ............................ 46/201 |

FOREIGN PATENTS OR APPLICATIONS 246,955   5/1966   Austria .............................. 211/162

*Primary Examiner*—Ramon S. Britts
*Attorney*—John W. Melville, Gibson R. Yungblut et al.

[57] ABSTRACT

Removable wheel mounting means for a dishwasher rack or the like. Each wheel mounting means comprises a wheel mount and a wheel rotatively affixed thereto. For each wheel mount there is provided a snap-acting means to removably affix the mount to the rack and means to prevent relative movement of the mount with respect to the rack.

10 Claims, 9 Drawing Figures

PATENTED JUL 10 1973
3,744,646
SHEET 1 OF 2
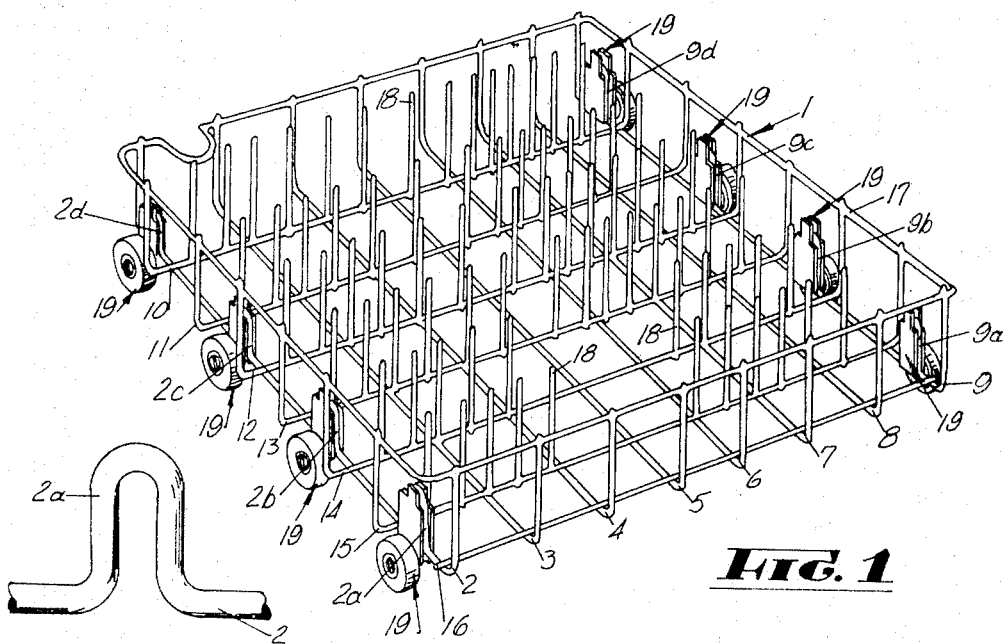
FIG. 1
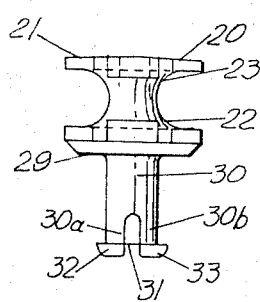
FIG. 2
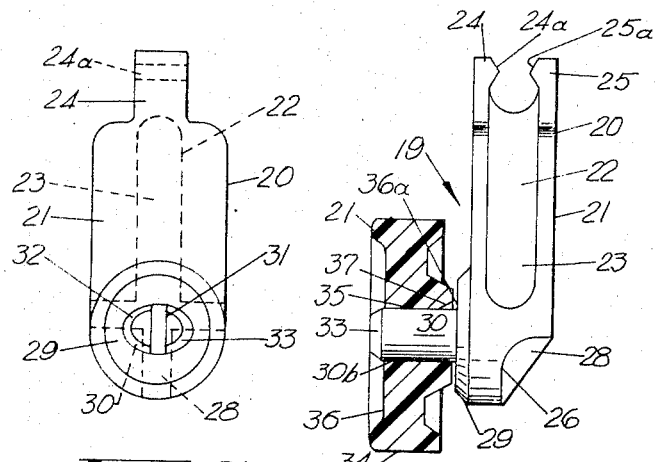
FIG. 3  FIG. 4  FIG. 5
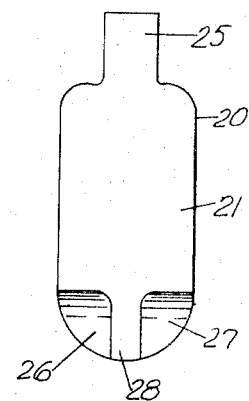
FIG. 6
INVENTOR/S
THOMAS W. DUNCAN
SYLVAN L. HIERS
BY *Melville, Strasser, Foster and Hoffman*
ATTORNEYS

INVENTOR/S
THOMAS W. DUNCAN
SYLVAN L. HIERS

BY Melville, Strasser, Foster and Hoffman
ATTORNEYS

WHEEL MOUNTING MEANS FOR DISHWASHER RACKS

BACKGROUND OF THE INVENTION

1. Field of the Invention

The invention relates to wheel mounting means for the racks of dishwashing machines and the like, and more particularly to mounting means whereby the wheel may be readily removed from the rack and replaced.

2. Description of the Prior Art

The wheel mounting means of the present invention may be utilized in conjunction with any sort of rack or drawer means provided with appropriate U-shaped recesses. While not intended to be so limited, the present invention will, for purposes of an exemplary showing, be described with respect to the mounting of wheels on wire racks of the type utilized in dishwashing machines.

In the usual practice, dishwasher racks are fabricated from a plurality of wire elements arranged in grid-like fashion. Thus, a plurality of wire elements in parallel spaced relationship will extend from the rearward to the forward end of the rack. Similarly, a plurality of wire elements in parallel spaced relationship will extend from side to side of the rack. Additional joining wire elements may be used, together with further wire elements arranged to appropriately support tableware. The entire assembly is coated with a plastic insulative material adapted to prevent corrosion of the wire rack in the corrosion or rust promoting conditions encountered in a dishwashing machine.

Generally, a dishwashing machine is provided with one or more tableware racks. The racks have wheels mounted thereto which roll on appropriate ways or tracks. As a result, the racks are shiftable between a position wherein they are located fully within the dishwasher vat, and a position wherein they are partially or fully withdrawn from the diswasher vat through the vat opening, for purposes of loading or unloading tableware.

Hitherto, the wheels have generally been riveted to the appropriate ones of the rack wire elements. The riveting operation frequently removes some of the protective plastic coating on the wire elements, subjecting them to the possibility of corrosion. The riveting of the wheels to the rack renders the wheel mounting substantially permanent. Thus, if a wheel becomes broken or damaged, it can only be replaced with difficulty, and in some instances it can not be replaced at all.

The mounting means of the present invention provides a much more economical use of material. The initial assembly of the wheels on the rack is much simpler and faster. The wheels may be readily replaced in the field and the mounting means does not damage the protective plastic coating on the rack so that a common source of corrosion problems is eliminated.

SUMMARY OF THE INVENTION

In accordance with the present invention, a rack or the like is provided with a U-shaped recess or loop at each position on the rack where a wheel is to be located. A wheel mounting means is provided for each wheel. Each wheel mounting means comprises a body portion with a laterally extending wheel axle. The wheel is rotatively affixed to the axle. The mounting means body has a peripheral U-shaped groove adapted to engage with a U-shaped recess or loop of the rack. Means may be provided whereby this engagement may be of the nature of a snap fit.

The wheel mounting means and the rack loops will be so oriented that the forces applied to the wheels by a load in the rack will tend to urge the wheel mounting means to their fully seated and engaged positions with the rack loops. As will be shown hereinafter, this orientation may be varied and the mounting means of the present invention may be applied to both the upper and lower racks of a dishwashing machine. Finally, stop means may be incorporated with some at least of the wheel mounting means, whereby movement of the rack is limited.

BRIEF DESCRIPTION OF THE DRAWINGS.

FIG. 1 is a perspective view of an exemplary rack incorporating the wheel mounting means of the present invention.

FIG. 2 is a fragmentary elevational view of a loop of the rack of FIG. 1.

FIG. 3 is a front elevational view of the mounting means of the present invention.

FIG. 4 is a side elevational view, partly in cross section, of the mounting means of the present invention with a wheel affixed thereto.

FIG. 5 is a rear elevational view of the mounting means of the present invention.

FIG. 6 is a plan view of the mounting means of the present invention.

DESCRIPTION OF THE PREFERRED EMBODIMENTS

Figure 7:
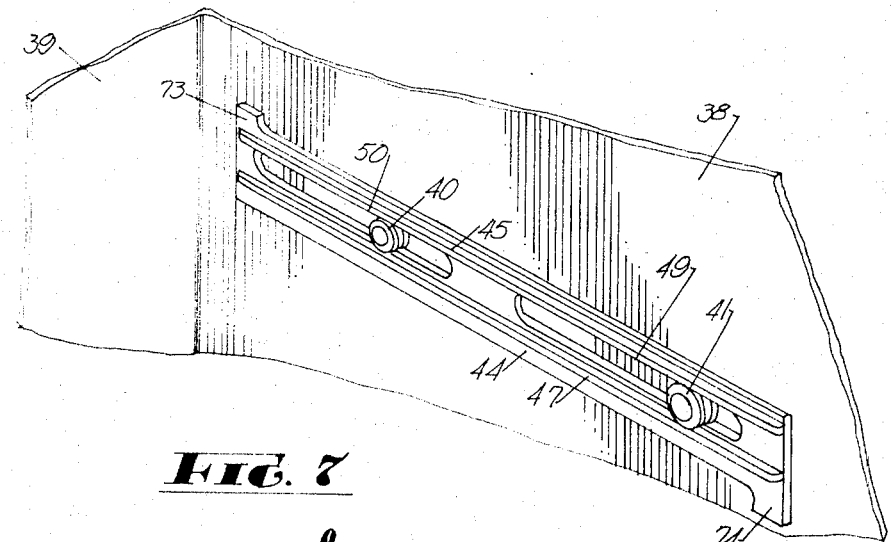
FIG. 7 is a fragmentary perspective view of a side wall of a dishwasher vat with a slide for an upper rack affixed thereto.

FIG. 1 illustrates an exemplary form of wire rack, typical of those found in dishwashing machines. Again, as indicated above, it will be understood by one skilled in the art that the nature and configuration of the rack and the materials from which it is made do not constitute a limitation on the present invention. The exemplary rack is generally indicated at 1 and comprises a plurality of wire members 2 through 9 in parallel spaced relationship. The parallel members 2 through 9 extend from the rearward end to the forward end of the rack and have their ends upturned to form the forward and rearward rack walls. A series of similar wire members 10 through 16 are oriented in parallel spaced relationship and extend from one side of the rack to the other. Members 10 through 15 have upturned ends to define the side walls of the rack. Finally, a wire member 17 is affixed to the upturned ends of the members 2 through 15 and defines the upper edge of the rack. Additional wire members 18 may be provided in any suitable arrangement to appropriately support tableware within the rack.

Typically, such a rack is made of carbon steel wire of a size ranging from number 8 gauge to about number 11 gauge, and the various wire members are welded together. The completed rack is then dipped or otherwise coated with a tough, protective plastic to prevent corrosion or rust of the rack.

The number of wheels affixed to the rack does not constitute a limitation on the present invention. For purposes of an examplary showing, the rack 1 is illustrated as having four wheels on each side. Thus, the rack members 2 and 9 (constituting those members running from the rearward to the forward ends of the rack and lying nearest the sides thereof) are each provided with four identical, inverted, U-shaped loops. The loops on the element 2 are indicated at 2a through 2d. The loops on the element 9 are indicated at 9a through 9d. The loop 2a of the plastic coated rack member 2 is illustrated in FIG. 2. As indicated above, the remaining loops 2b through 2d and the loops 9a through 9d are identical to that shown in FIG. 2.

In each of the loops 2a through 2d and 9a through 9d there is affixed a wheel and wheel mounting means assembly. These wheel and wheel mounting means assemblies are identical and are generally indicated at 19.

The full wheel and wheel mounting means assembly 19 is illustrated in FIG. 4 and comprises the wheel mounting means 20 and the wheel 21. FIGS. 3 through 6 are, respectively, a front elevational view, a side elevational view, a rear elevational view and a plan view of the wheel mounting means 20.

The wheel mounting means 20 comprises a body 21 having a peripheral groove 22 extending along the sides and top thereof. The groove 22 is of inverted, U-shaped configuration and is so sized as to receive the loop 2a of FIG. 2. The groove 22 defines a core 23 of the body 21 which is adapted to be received within the space between the legs of the loop 2a of FIG. 2.

At the upper end of the mounting means 20 there is a pair of extensions 24 and 25. The facing surfaces of the extensions 24 and 25 have thereon projections 24a and 25a, respectively. The distance between the projections 24a and 25a is slightly less than the diameter of the plastic coated wire constituting the loop 2a. As will be described hereinafter, this provides a snap fit between the mounting means 20 and the rack loop.

The lower end of the body 21 of the mounting means 20 may be under cut as at 26 and 27, for a savings of material. The under cuts 26 and 27 define a reinforcing rib 28.

At the lower end of the body 21 of the mounting means 20 there is located a circular bearing surface 29. Centrally of the bearing surface 29 there extends a shaft or axle 30 of circular cross section. As is most clearly shown in FIGS. 3 and 6, the outermost end of the shaft 30 is notched as at 31 to provide bifurcations 30a and 30b. The ends of the bifurcations 30a and 30b are provided with extensions 32 and 33 respectively. As viewed from the side (FIG. 4) it will be noted that the extension 33 is of the same vertical dimension as is the bifurcation 30b. However, as viewed from the top (FIG. 6) it will be noted that the extension 33 extends slightly beyond the bifurcation 30b to form a lip thereon. The same is true of the extension 32, with respect to its bifurcation 30a. Thus, the extension 32 forms a lip on the bifurcation 30a. As a consequence of this, it will be noted that the end of the shaft or axle 30 appears to be oval or eliptical (see FIG. 3) by virtue of the extensions 32 and 33.

The mounting means structure thus far described may be made as an integral, one-piece molded element of any suitable, tough material capable of withstanding both water and heat as found within the vat of a dishwasher. Nylon is a non-limiting, exemplary material which has been found to serve the purpose well.

Turning to FIG. 4, the wheel 21 may have any suitable peripheral configuration. For purposes of an exemplary showing, it is illustrated as having a simple, flat, annular surface 34. The wheel 21 has an axial bore 35 of circular cross section and of a diameter slightly larger than the diameter of the shaft or axle 30, so that when the wheel is mounted on the axle it will rotate freely. The wheel is shown as having a forward surface 36 and a rearward bearing surface 36a adapted to cooperate with the bearing surface 29 on the mounting means 20. The axial bore or perforation 35 is flared as at 37 near its juncture with the bearing surface 36.

From the above description, it will be evident that the wheel may be affixed to the mounting means 20 by simply forcing it onto the axle or shaft 30. The flared surface 37 on the wheel will tend to cause the bifurcations 30a and 30b and their extensions 32 and 33 to move toward each other. This will enable the extensions 32 and 33 to pass through the axial bore 35 of the wheel. Once the extensions 32 and 33 have passed through the axial bore, they will return to their normal position (as shown in FIGS. 3 and 6). This will insure that the lip-forming extensions 32 and 33 on the axle 30 will cooperate with the forward surface 36 of the wheel 31 to captively hold the wheel 21 on the axle 30. As in the case of the mounting means 20, the wheel 21 may be a simple, molded member of any suitable plastic material capable of withstanding the water and heat found in the dishwasher vat. An exemplary but non-limiting material, which has been found to serve well for the molding of the wheels, is talc-filled polypropylene.

The wheel and wheel mounting means assembly 19 (FIG. 4) may be readily affixed to the loop 2a (FIG. 2) either by machine or by hand. It is only necessary to shove the mounting means 20 upwardly into the loop 2a until the loop becomes seated within the groove 22 of the mounting means body 21. The projections 24a and 25a are so configured that during the assembly procedure they will first be spread apart so that the adjacent portion of the loop 2a may pass therebetween. Once the loop 2a is fully seated in the groove 22, the projections will return to their normal position, as shown in FIG. 4, and will serve to maintain the mounting means 20 within the loop 2a with a snap fit. It will be understood by one skilled in the art that the remaining wheel and wheel mounting means assemblies will be affixed to the rack 1 (FIG. 1) in an identical manner. The wheel and mounting means assembly 19 may be remove from the rack loop by simply pulling downwardly on it. The projections 24a and 25a will again be spread apart by the loop to permit passage of the adjacent part of the loop therebetween.

The rack assembly of FIG. 1 may be considered to be either an upper rack or a lower rack of a dishwashing machine. When used as an upper rack, appropriate rails or the like will be located on the sides of the dishwasher vat to enable to the rack to be shifted at least part way through the vat opening so that it may be loaded or unloaded with tableware. When used as a lower rack, the wheels will ride on tracks or ledges formed in the vat wall. It is conventional, for example, to have the lower rack roll from such ledges or tracks onto to the inside surface of the vat door when the door has been lowered to a substantially horizontal position. When the rack is moved to its position on the inside surface of the door, it will be substantially completely withdrawn from the vat and may be readily loaded and unloaded with tableware.

Figure 8:
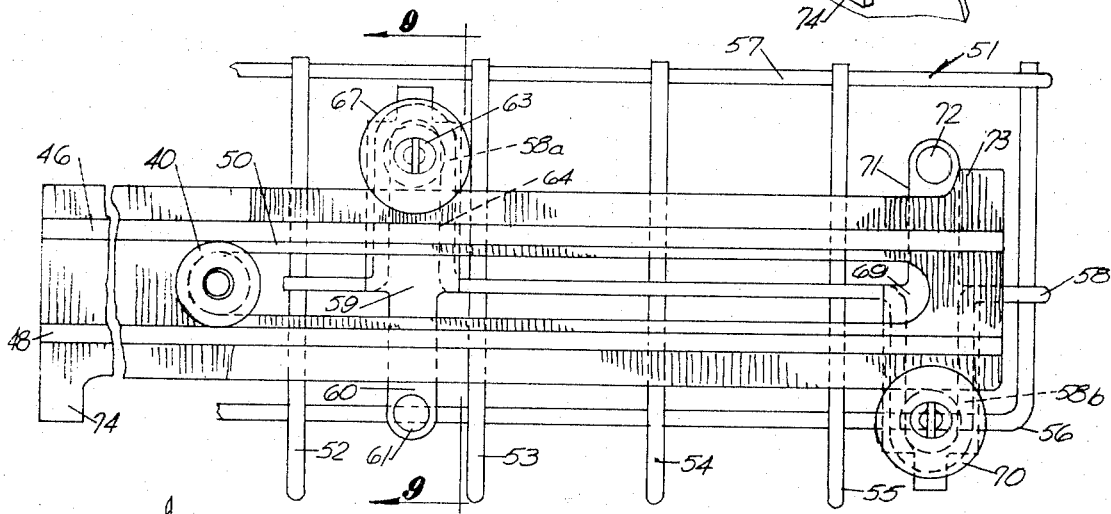
FIG. 8 is a fragmentary side elevational view of an upper rack and a slide, illustrating the mounting means of the present invention.
Figure 9:
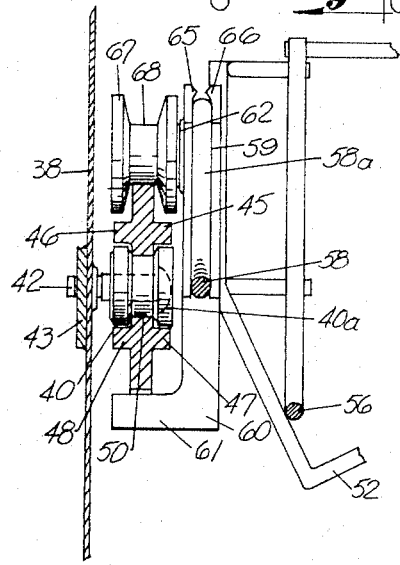
FIG. 9 is a cross sectional view taken along the section line 9—9 of FIG. 8.

FIGS. 7, 8 and 9 illustrate how the mounting means of the present invention may be modified both as to configuration and orientation. These Figures illustrate the use of the wheel mounting means of the present invention in an embodiment for the mounting of an upper dishwasher rack.

FIG. 7 is a perspective view illustrating a portion of the vat side wall 38 and a portion of the vat rear wall 39. A pair of wheels 40 and 41 are rotatively affixed to the vat wall 38. Referring to FIG. 9, it will be seen that the wheel 40 is affixed to the vat wall 38 by a machine screw 42, or the like, passing through an axial bore in the wheel 40, a perforation in the vat wall and a threaded perforation in a brace member 43 on the other side of the vat wall. It will be understood that the wheel 41 will be affixed in the same manner.

A slide 44 is shown in FIG. 7 captively mounted on the wheels 40 and 41. As is shown in FIGS. 7 through 9, the slide has an upper pair of longitudinal ribs 45 and 46 located on either side of the slide and a lower pair of longitudinally extending ribs 47 and 48, again located on either side of the slide.

Between the pairs of ribs, the slide is provided with two longitudinally extending slots 49 and 50. Referring to FIG. 9, it will be noted that the wheel 40 has an annular groove 40a having a diameter slightly less than the height of the groove 50. The peripheral portions of the wheel 40 on either side of the annular groove 40a have diameters greater than the height of the groove 50. It will be understood that the relationship between the wheel 41 and the groove 49 will be the same. Thus, the slide is captively and shiftably held to the side 38 of the vat by the wheels 40 and 41.

The slide 44 is shiftable between a position wherein it is totally within the vat and a position wherein it extends partially out of the vat through the vat opening (not shown). The innermost position of the slide (i.e., that position wherein it most nearly approaches the rear vat wall 39) will be determined by the abutment of the wheels 40 and 41 with the forwardmost ends of their respective slots 50 and 49. The forwardmost or extended position of the slide 44 (i.e., that position furthest from the rear vat wall 39) will be determined by the abutment of wheels 40 and 41 with the rearwardmost ends of their respective slots 50 and 49.

It will be understood by one skilled in the art that a second slide, identical to slide 44, will be mounted on the other side wall of the vat (not shown) in an identical manner by means of a pair of wheels similar to the wheels 40 and 41. The two slides are intended to serve as intermediate extensible members or tracks upon which the upper rack will ride, so that the upper rack may be substantially completely withdrawn from the dishwasher vat (while still mounted on the tracks) for purposes of loading and unloading tableware therefrom.

FIG. 8 illustrates the manner in which the upper rack is mounted on its slides. FIG. 8 is a fragmentary side elevational view of the upper rack (generally indicated at 51) and shows only the rear portion of the upper rack. the upper rack is made up of a plurality of wire elements extending from side to side in parallel spaced relationship. Some of these wire elements are shown at 52 through 55. The rack has a series of additional wire elements extending from its rear end to its forward end in parallel spaced relationship. One of these last mentioned wire elements is shown at 56. In addition, a wire element is illustrated at 57 which forms the upper edge of the rack. Finally, there is a wire element 58 extending along the side of the upper rack and positioned between the upper and lower edge of the rack side.

It will be understood by one skilled in the art that the structure of the upper rack 51 is exemplary only. The precise construction of the rack does not constitute a limitation on the present invention.

The wire element 58 has, near the rear end of the rack, a pair of loops 58a and 58b. These loops are identical to those shown in FIGS. 1 and 2. It will be noted, however, that the loop 58a extends upwardly and the loop 58b extends downwardly.

The loop 58a has engaged therein a wheel mounting means 59 which differs from that described with respect to FIGS. 3 through 6 in only one respect. At the bottom end of the mounting means 59 there is an extension 60 terminating in a laterally extending stop member 61. The purpose of this stop member will be described hereinafter. Otherwise, the mounting means 59 has a bearing surface 62 identical to the bearing surface 29 of the mounting means 20 of FIGS. 3 through 6. It further has an axle, generally indicated at 63, which is identical to the axle 30 of the mounting means 20. Finally, it has a groove 64 equivalent to the groove 22 and a pair of spaced extensions 65 and 66 equivalent to the extensions 24 and 25 of the mounting means 20 and adapted to serve the same purpose. The mounting means 59 rotatively supports a wheel 67, which is affixed thereto in precisely the same manner shown in FIG. 4. The wheel 67 differs from the wheel 21 of FIG. 4 in that its peripheral surface has an annular depression 68 located centrally thereof, so that the wheel can straddle the upper edge of the slide 44.

FIG. 8 further illustrates a mounting means 69 engaged in the loop 58b. The mounting means 69 is identical to the mounting means 59 and rotatively supports a wheel 70 which may be identical to the wheel 67. The wheel 70 is adapted to straddle the lower edge of the slide 44. The mounting means 69 has an extension 71 with a transversely extending stop 72, identical to the extension 60 and stop 61 of the mounting means 59.

It will be understood by one skilled in the art that the rack 51 will have on its other side (not shown) a wire element equivalent to, but a mirror image of, the wire element 58. This equivalent wire element will support a pair of mounting means identical to the mounting means 59 and 60. These last mentioned mounting means will support wheels adapted to engage the slide (not shown) mounted on the opposite side of the dishwasher vat.

From the above description, it will be evident that the upper rack 51 will be shiftable with respect to the slides upon which it is mounted. The slides, in turn, will be shiftable with respect to the vat. This combination of elements will permit the upper rack to be moved between a position wherein it is wholly within the dishwasher vat and a position wherein it is substantially wholly outside the dishwasher vat, having passed through the vat door.

As is shown in FIGS. 7 and 8, the slide 44 is provided with an upwardly extending abutment 73 at its rearward end and a downwardly extending abutment 74 at its forward end. The rearwardmost position of the upper rack 51, with respect to the slide 44, will be determined by the coaction of the abutment 73 and the stop 72 on the mounting means 69. The forwardmost position of the upper rack 51, with respect to the slide 44, will be determined by the interaction of the slide abutment 74 and the stop 61 on the mounting means 59. It will be understood that the other slide (not shown) will be provided with similar abutment means, which will cooperate with stop means on those mounting means (not shown) affixed to the other side of the rack. In addition, the stop means 61 and 72 on the mounting means 59 and 69 will assure that the rack 51 can not be inadvertently disengaged from the slide 44. The same, of course, will be true with respect to the slide on the other side of the rack. Thus, the stops 72 and 61 serve to trap the slide within the wheel-bracket assemblies. If the rack were lifted as it was being slid out, there would be a chance for disengagement of the wheel 67 from the slide. Also, if excessive weight were placed in the front of the rack, the rear wheel 70 could be lifted off the slide. In either case, side movement of the rack would then cause the wheels to be derailed with unsatisfactory results. The stops 72 and 61 prevent this from happening.

The mounting means 59 and 60 will have all of the advantages described with respect to the mounting means 20 of FIGS. 3 through 6. The manner in which the mounting means are affixed to the upper rack 51, or removed therefrom for replacement purposes, will be identical to that described with respect to the embodiment of FIGS. 3 through 6.

Modifications may be made in the invention without departing from the spirit of it.

The embodiments of the invention in which an exclusive property or privilege is claimed are defined as follows:

1. A removable wheel assembly for use on the rack of a dishwashing machine or the like, said wheel assembly comprising a wheel mount and a wheel rotatably affixed thereto, said rack having a U-shaped recess at the position on said rack where said wheel assembly is to be mounted, said wheel mount comprising a body, said body having a first and second sides and top, bottom and side edges, grooves extending along said side edges and said top edge being bifurcated to form a peripheral U-shaped groove along said side and top edges, means at said top edge releasably engaging said body in said recess and preventing relative movement of said wheel mount body with respect to said rack recess, axle means extending laterally of said first side of said wheel mount body and said wheel being rotatively mounted on said axle means.

2. The structure claimed in claim 1 wherein said wheel mount is a unitary, one-piece molded member.

3. The structure claimed in claim 1 wherein the free end of said axle is bifurcated, said bifurcations having flanges thereon, said wheel having an axial bore of a diameter slightly greater than said axle, said bifurcations being deformable toward each other and said flanges being so sized as to pass through said axial bore in said wheel when said bifurcations are deformed toward each other, whereby said wheel may be forced onto said axle and retained thereon by said flanges when said flanges have passed through said bore.

4. The structure claimed in claim 2 wherein said means to releasably engage said body in said recess is a snap-acting means comprising a part of said unitary, one-piece molded member.

5. The structure claimed in claim 1 wherein said rack is made up of a plurality of coated wire elements, said recess comprising a U-shaped loop in a selected one of said wire elements.

6. The structure claimed in claim 5 wherein said means to releasably engage said body in said recess is a snap-acting means comprising said bifurcations at said top edge of said mount said bifurcations being resilient, the free ends of said bifurcations being spaced from each other by a distance less than the diameter of said coated wire of said loop, whereby when said mount is engaged in said loop said ends of said bifurcations will be forced over the base portion of said U-shaped loop and provide a snap engagement of said mount therewith.

7. In a dishwasher of the type having a vat with a bottom, a top, a rear wall, side walls, a front wall with an access opening and at least one rack for tableware, an elongated slide mounted on each side wall, said slides being shiftable between a retracted position wholly within said vat and a forward position wherein said slides extend part way through said access opening, each of said slides having a top edge, a bottom edge and forward and rearward ends, a pair of wheels on each side of said rack, a wheel mount for each of said wheels, each of said wheels rotatively affixed to its respective mount, said rack having a U-shaped recess at the position on said rack where each of said wheels is to be mounted, each of said wheel mounts comprising a body having a peripheral U-shaped groove, each of said wheel mount bodies being configured to be engaged in its respective one of said rack recesses with the peripheral portion of said recess being received in said wheel mount body groove, a snap-acting means to removably retain each of said mounts in its respective rack recess and to prevent relative movement of said mounts with respect to their respective rack recesses, one wheel of each pair engaging said upper edge of the adjacent one of said slides, the other wheel of each pair engaging said bottom edge of the adjacent one of said slides, said rack being movable on said slides between a position wherein said rack is located substantially wholly between said slides and a position wherein a portion at least of said rack extends beyond said forward ends of said slides, whereby the movement of said slides with respect to said side walls and the movement of said rack on said slides render said rack shiftable between a position wholly within said vat and a position substantially wholly outside said vat.

8. The structure claimed in claim 7 wherein each of said mounts comprises a unitary, one-piece molded member.

9. The structure claimed in claim 8 wherein each of said slides has an abutment means at its forward end and an abutment means at its rearward end, each of said mounts having an elongated extension with a stop means thereon, the stop means of each wheel mount being so positioned as to cooperate with the adjacent one of the abutments on its respective slide, whereby to define said two positions of said rack on said slides.

10. The structure claimed in claim 6 including a plurality of said wheel assemblies, said rack having a number of said U-shaped loops equal to the number of said wheel assemblies and located at positions where said wheel assemblies are to be mounted on said rack, the wheel mount body of each assembly being engaged in its respective one of said rack loops.

* * * * *